Oct. 23, 1962  G. J. HANNES  3,060,068
LAMINATE AND METHOD OF FORMING SAME
Filed July 17, 1958

INVENTOR.
George J. Hannes
BY
Nobbe & Swope
ATTORNEYS

United States Patent Office 3,060,068
Patented Oct. 23, 1962

3,060,068
LAMINATE AND METHOD OF FORMING SAME
George J. Hannes, Maumee, Ohio, assignor, by mesne assignments, to Johns-Manville Fiber Glass Inc., Cleveland, Ohio, a corporation of Delaware
Filed July 17, 1958, Ser. No. 749,139
11 Claims. (Cl. 154—43)

The present invention relates broadly to preformed resin impregnated glass fiber laminates and to a method of forming the same. More particularly, the invention relates to such laminates which are especially adapted for use as automotive headliners although they are of course not limited to such use.

Conventional automobile headliners consist of cloth fitted along the length of sets of listing wires, the listing wires being arranged in a frame on the inside of the top or roof of the automobile and spaced therefrom in a manner to follow the curvature thereof. In applying the conventional cloth headliner, it is customary to sew the cloth loosely to the listing wires and then to steam shrink the cloth to tighten it and to remove wrinkles therefrom. At times a sheet of insulating material may be inserted behind the listing wire cloth liner.

It is well recognized that there are a great many drawbacks to this conventional type of headliner construction. A principal drawback is that the type of headliner customarily found in today's automobiles requires an excessive number of man hours for fabrication and finishing and this results in excessive production costs in present mass production requirements.

Attempts have been made by the industry to provide a headliner for automobiles that would eliminate the conventional listing wire framework and covering cloth and which are comprised of resilient, flexible and dimensionally stable fibrous mats. Typical of the type of headliner which has proven successful for the present mass production techniques in automobile manufacture is a composite glass fiber resin impregnated mat having a decorative, protective covering bonded to the exterior surface thereof. Such preformed headliners may be inserted, in one or more sections, in the automobile frame and it is a simple matter for the worker to fasten them into position, thus eliminating the excessive number of man hours required by the former time consuming method. Preformed resin impregnated glass fiber laminates having the desired physical characteristics, along with an attractive outer surface, and methods for economically fabricating them, have presented problems which to date have not been satisfactorily overcome.

It is therefore a primary object of this invention to provide a unitary shaped glass fibrous laminate structure which is resilient, flexible, and dimensionally stable and which is especially well adapted for use in installation in automobiles as an automobile headliner.

Another object of this invention is to provide an automobile headliner having superior shock absorbing and heat and sound insulating qualities compared to the conventional headliners and which is so constructed as to lend itself readily to improved methods of fabrication.

Another object of this invention is to provide an automobile headliner having a decorative and protective exterior covering.

A further object of this invention is to provide an improved method of forming a headliner having the above-described properties.

Other objects and features of the invention will appear from the following description.

In the drawings, wherein like numerals are employed to designate like parts throughout the same:

FIG. 1 diagrammatically illustrates the several layers which go to form the laminate of this invention;

Figure 1:
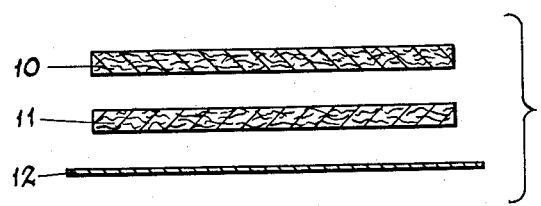

As shown in FIG. 1, the laminate of this invention is made up of three individual layers 10, 11 and 12. The uppermost or outer layer 10 comprises a glass fibrous mat having an uncured thermosetting resin applied thereto. The second or intermediate layer 11 is also a glass fibrous mat which is impregnated with a thermoplastic resin, and the third layer 12 is a covering sheet of a decorative and protective material, preferably a vinyl resin such as a vinyl chloride or a vinyl acetate film. Each of the layers is cut to conform to the desired configuration.

Figure 2:
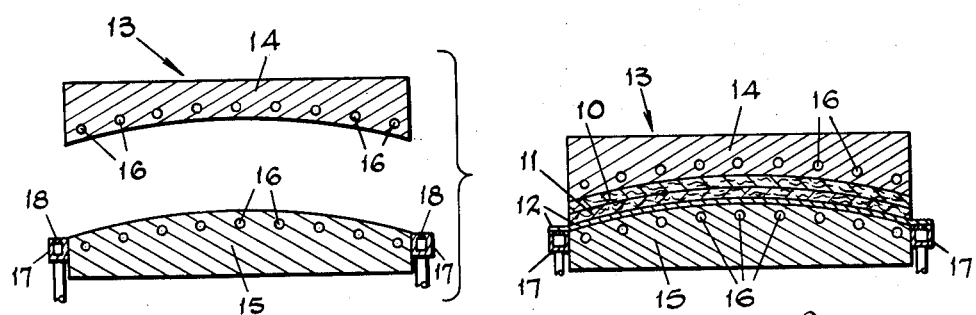
FIG. 2 illustrates the laminate molding apparatus in an open position.

In forming the laminate, the several layers are assembled as shown in FIG. 1, and inserted into the mold 13, diagrammatically represented in FIG. 2. Prior to assembling the layers, however, a coating or film of a suitable thermoplastic adhesive is interposed between the intermediate layer 11 and sheet 12. Satisfactory results have been obtained by spray coating a water emulsion of acrylic resin onto the surface of the intermediate layer 11 and/or sheet 12.

Figure 3:
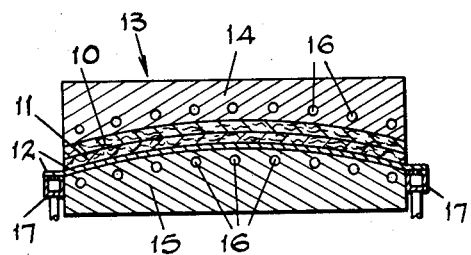
FIG. 3 illustrates the molding apparatus in a closed position with a glass fiber resin impregnated laminate being cured therein under heat and pressure.

After the assembly is placed in the mold 13, the upper platen 14 and lower platen 15 thereof are brought together, as in FIG. 3, to bond the several layers together and mold them to the desired shape. The upper platen 14 is operated at a temperature of approximately 350° to 500° F. so that the combined action of heat and pressure will act to mold the sandwich structure into the desired form and simultaneously cure the thermosetting resin contained in the upper glass fiber layer 10. The lower platen 15 is operated at a relatively lower temperature, preferably below the temperature at which the layer or sheet 12, which is in contact therewith, will decompose, such as when a vinyl film is used. The temperature of the lower platen may be in the order of 200° to 400° F. Both platens are heated by means of thermostatically controlled heating elements 16 embedded just beneath the heating surfaces of said platens.

On curing under heat and pressure as above described, the thermosetting resin impregnated mat 10 is shaped to conform to the surface of the upper platen 14, with which it is in contact and at the same time, the layers 10 and 11 are compressed as shown in FIG. 3. The compressed thermosetting resin impregnated layer 10 is thus formed with a relatively rigid, dense upper surface and provides the structural strength required in the completed laminated structure.

Figure 5:
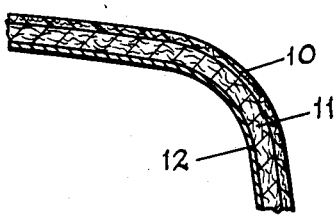
FIG. 5 illustrates a section of an automobile headliner provided by the invention and formed in accordance with the method thereof.

The intermediate layer 11 is not affected to as great an extent by the heat of the upper platen since layer 10 acts as an insulating medium to a certain degree. Although it is compressed within the mold, layer 11 retains a certain amount of resiliency so that, upon removal from the mold, this layer springs back to approximately its initial thickness as shown in FIG. 5 whereas the layer 10 retains its compressed thickness.

The intermediate layer 11 is therefore of a relatively lower density than layer 10 and imparts the desirable acoustical properties to the laminate structure. As a result of the compression of the top layer 10 during the molding operation, this layer is reduced in thickness to a range of between about 1/16 inch to about 1/4 inch with a corresponding increase in density. With a thickness of about 1/16 inch, the molding operation compresses the layer 10 to a density of about 14 pounds per cubic foot, whereas, with the layer 10 compressed to a thickness of about ¼ inch the density thereof is about 3 pounds per cubic foot. During molding the layer 11 is also bonded to the layer 10 by means of the thermosetting resin contained in layer 10 which, on curing, forms a bond at the interface between the two layers. While layer 11, of itself, is not dimensionally stable, it retains the shape imparted to it by the mold by means of the bond with the more rigid outer layer 10.

When a thermoplastic film or sheet 12 is used as the covering layer, the lower mold platen is maintained at a temperature which is sufficient to soften, but not decompose, the thermoplastic sheet placed in contact therewith. The heat of the mold acts to soften a portion of the thermoplastic resin contained in the intermediate layer 11 at the interface between said intermediate layer and sheet 12 at the same time as the adhesive coating therebetween is activated. A firm bond is thus formed with the softened thermoplastic resin at the interface on cooling the laminate. When fabrics are used for the outer covering layer the temperature of the lower platen may be raised, although this too is dependent on the heat resistant qualities of the material utilized.

The mold is retained in the closed position shown in FIG. 3 for a period of time sufficient to cure the thermosetting resin contained in layer 10 and to bond the several layers together. The mold is then opened to permit the desired cooling of the laminate prior to removal from the mold.

Upon removal from the mold, the complete laminate structure will conform to the configuration imparted thereto by platens 14 and 15. When a headliner is being formed, the edge of the laminate structure is then trimmed so that the headliner, upon insertion into an automobile frame, forms an exact match with the concave inner surface of the automobile roof or top. Any desired compound curves of automobile ceilings may be exactly matched through the use of properly shaped platens in molding.

Figure 4:
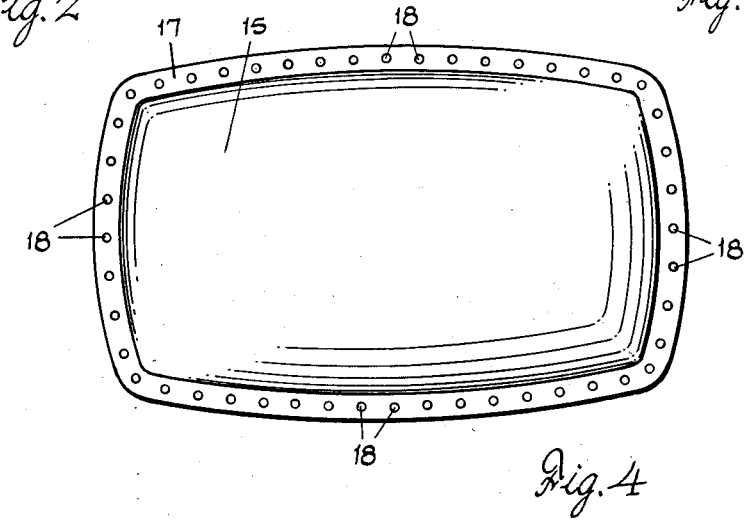
FIG. 4 is a plan view of the lower platen of the molding apparatus showing the vacuum holes positioned around the periphery thereof.

The covering sheet or film 12 may be firmly stretched over the lower platen 15 by means of a vacuum established in the lower platen. This vacuum is maintained by means of the vacuum line 17 and is transmitted to the covering sheet by means of the holes 18 shown in FIG. 4. The use of such a vacuum on molding provides a wrinkle free surface in the finished article.

By using a thermoplastic sheet, such as a sheet of vinyl resin, as the covering surface layer, it is possible to impart innumerable decorative designs to said sheet. This may be done by embossing the lower platen 15 of the mold with a decorative design which is then imparted to the plastic sheet while the laminate structure is being cured within the mold. This layer is not only decorative but is also easily cleaned and provides a protective cover for the laminate.

Other decorative and protective surfacing materials may be used in place of the thermoplastic sheet in the above-recited laminate structure. Thus glass cloth and other fabrics have been utilized satisfactorily and glass cloth in particular has provided one exceptionally attractive effect.

The above described laminated structure provides a unitary shaped glass fiber resin impregnated headliner which is resilient, flexible, and dimensionally stable. Such a headliner has superior shock absorbing and heat and sound insulating qualities as compared to conventional headliners. Additionally, it is provided with a decorative and protective surface which, in the headliner, is positioned on its concave surface so as to face interiorly of the automobile.

The laminate and method of this invention are particularly well suited to economical production techniques. Thus the laminate may be produced from pre-cut sections of continuously produced glass fibrous mat and sheet material. The two upper layers 10 and 11 may be formed from a substantially endless mat of resin impregnated glass fibers which are continuously produced by flame blowing individual filaments of glass, as they are attentuated and drawn from a glass melting pot or bushing, into fine glass filaments which are collected on a continuously moving conveyor belt in the form of a glass fiber mat as is well known in the art.

When forming the mat which is used for the intermediate layer 11, a thermoplastic resin may be sprayed thereon at an elevated temperature, the resin setting up and bonding the fibers on cooling, or the thermoplastic resin may be applied to said mat in powdered form. Various of the well known thermoplastic binders, such as vinyl chloride, have been satisfactorily utilized in the intermediate layer. When forming the mat that is used for the layer 10, a thermosetting resin is sprayed onto the mat at room temperature and remains in an uncured viscous state until the molding operation. Thermosetting resins which have proven preferable in the practice of the invention are phenol and melamine formaldehyde condensation type resins.

The density of the mats 10 and 11 is easily controlled by the rate at which the conveyor is moved relative to the fiber collecting area and by the amount of fibers produced at the collecting area. The densities of the glass fiber mats above described may be the same or different from one another as desired. For example, both mats may have a density of approximately three quarter pound per cubic foot and may be approximately three quarter inch thick. However, the densities and thicknesses of the mats may be varied to a considerable degree without affecting the structural characteristics of the product. Such qualities as sound absorbing and thermal characteristics may be readily controlled by varying the pressure and time of lamination, the amount of resin and the thickness and density of the glass fiber layers.

The amount of resin used to produce a firmly bonded structure is nominally approximately 20 percent based on the weight of the layer or mat. However, satisfactory results have been achieved where the percentage of resin binder used varied from 7 to 30 percent. The mats 10 and 11 may contain the same or different amounts of resin binder as desired.

Any type of siliceous fiber may be used in forming the fibrous layers 10 and 11 of the laminate. So-called "B" fibers, which are glass fibers having an average diameter of 3 microns, seem to be especially well suited to the invention.

Each of the three layers of the above-described laminate are specially designed so as to individually contribute, on molding, to a completed laminate which is resilient, dimensionally stable, and flexible and which additionally possesses excellent shock absorbing, heat and sound insulating and decorative qualities. Additionally, the resin contained in the several layers reacts, under heat and pressure, to form a unitary structure firmly bonded throughout.

The method contemplated for forming the headliners above described requires but a single molding operation after the several layers are cut to the desired dimensions and after cooling, the headliners thus formed may be trimmed and are ready for assembly by insertion in automobile roofs. If desired, the cured shaped laminates may be cut into two or more sections so as to make installation through smaller openings in the automobile frame easier.

In actual installation, the workmen have only to insert the formed headliner into the automobile roof and fasten a molding around its periphery to secure it in place. A mastic may be applied initially to the interior surface of the automobile top, if desired, to assist in securing the headliner.

From the foregoing, it will be seen that a novel formed headliner and a novel method of producing the same have been provided. The headliner presents a decorative surface interiorly of the roof section of the car which is both attractive and easy to clean. Additionally, the headliner possesses superior shock absorbing, heat and sound insulating qualities, is readily and economically manufactured and is easily and quickly fitted within the automobile frame.

Since many possible embodiments of the invention may be made without departing from the scope thereof, it is to be understood that all matter shown in the accompanying drawings is to be interpreted as illustrative and not in a limiting sense.

I claim:
1. The method of forming a resilient, dimensionally stable shaped laminate structure firmly bonded throughout and faced with a covering thermoplastic sheet, comprising assembling a sandwich-like structure comprised of a thermoplastic sheet, an adhesive film, a resilient intermediate layer of glass fibers bonded together by thermoplastic resin, and a layer of glass fibers having an uncured thermosetting resin applied thereto, and curing said assembly under heat and pressure, said heat being sufficient to activate only a portion of the thermoplastic resin contained in said intermediate layer and to cure the thermosetting resin contained in said thermosetting resin impregnated glass fiber layer to form said layer to a dimensionally stable shape and to bond said layer to the intermediate layer, said heat being also sufficient to soften said thermoplastic sheet and activate the adhesive film at the surface between said intermediate layer and said thermoplastic sheet to bond the thermoplastic sheet to the intermediate layer.

2. The method according to claim 1 in which the thermoplastic sheet is stretched prior to laminating to maintain said thermoplastic sheet free of wrinkles.

3. The method of forming a resilient, dimensionally stable laminate firmly bonded throughout and faced with a covering layer, comprising curing, under heat and pressure, a sandwich-like structure comprised of a covering layer, a resilient intermediate layer of glass fibers bonded together by a thermoplastic resin, a thermoplastic adhesive film interposed between said covering layer and said intermediate layer and a layer of glass fibers having uncured thermosetting resin applied thereto in contact with said intermediate layer, said heat being sufficient to activate only a portion of the thermoplastic resin contained in said intermediate layer and to cure the thermosetting resin contained in said thermosetting resin impregnated glass fiber mat to form said mat to a dimensionally stable shape, and also being sufficient to activate said thermoplastic adhesive film to secure said covering layer to said intermediate layer.

4. A method in accordance with claim 3 in which the thermosetting resin is phenol formaldehyde.

5. A method according to claim 3 in which the covering layer is a thermoplastic film.

6. A method according to claim 3 in which the covering layer is glass cloth.

7. The method according to claim 3 in which the covering layer is stretched prior to laminating, thus maintaining said layer wrinkle free during laminating.

8. A resilient, dimensionally stable shaped laminate firmly bonded throughout, comprising a protective covering layer, a dimensionally unstable intermediate layer of glass fibers bonded together by means of a thermoplastic resin and having a density less than said covering layer, said covering layer and said intermediate layer being bonded together by a thermoplastic adhesive film interposed therebetween, and a dimensionally stable outer layer of glass fibers firmly bonded throughout by means of a cured thermosetting resin, and said outer layer and said intermediate layer being also bonded together by means of said cured thermosetting resin in said outer layer, said outer layer having a density between about 3 to 14 pounds per cubic foot.

9. A method of forming a resilient fibrous laminate comprising:
(1) forming a sandwich-like structure comprising a covering layer, an outer mat of glass fiber impregnated with uncured thermosetting resin binder and an intermediate mat of glass fiber impregnated with a thermoplastic resin; and
(2) applying sufficient heat and pressure to said sandwich-like structure to cure the thermosetting resin and to activate a portion only of the thermoplastic resin whereby the fibrous mats are bonded to one another, the covering layer is bonded to the thermoplastic resin impregnated mat and the final form desired for said laminate is achieved.

10. A method of forming a resilient fibrous laminate as described in claim 10 whereby a thermoplastic adhesive film is interposed between said covering layer and said intermediate mat and when subjected to said heat and pressure is activated so as to bond said covering layer to said intermediate mat.

11. A shaped fibrous laminate comprising a covering layer, an outer dense glass fiber mat, the fibers of which are bonded by a cured thermosetting resin binder and an intermediate mat of resilient glass fibers impregnated with thermoplastic resin, said intermediate mat being bonded to both said covering layer and said outer mat.

References Cited in the file of this patent

UNITED STATES PATENTS

| | | |
|---|---|---|
| 1,878,086 | Woodall et al. | Sept. 20, 1932 |
| 2,123,155 | Groff | July 5, 1938 |
| 2,227,212 | Beck | Dec. 31, 1940 |
| 2,478,267 | Hickler | Aug. 9, 1949 |
| 2,511,887 | Vinal | June 20, 1950 |
| 2,550,465 | Gorski | Apr. 24, 1951 |
| 2,768,026 | Stephens et al. | Oct. 23, 1956 |
| 2,797,179 | Reynolds et al. | June 25, 1957 |
| 2,815,309 | De Ganahl | Dec. 3, 1957 |
| 2,868,684 | Labino | Jan. 13, 1959 |
| 2,881,110 | Walker et al. | Apr. 7, 1959 |

FOREIGN PATENTS

| | | |
|---|---|---|
| 123,758 | Australia | June 4, 1945 |
| 530,523 | Canada | Sept. 18, 1956 |

UNITED STATES PATENT OFFICE
CERTIFICATE OF CORRECTION

Patent No. 3,060,068                        October 23, 1962

George J. Hannes

It is hereby certified that error appears in the above numbered patent requiring correction and that the said Letters Patent should read as corrected below.

Column 2, line 61, for "cetrain" read -- certain --; column 4, line 5, for "attentuated" read -- attenuated --; column 6, line 32, for the claim reference numeral "10" read -- 9 --.

Signed and sealed this 19th day of November 1963.

(SEAL)
Attest:

ERNEST W. SWIDER

Attesting Officer

EDWIN L. REYNOLDS

Acting Commissioner of Patents